(12) United States Patent
Hersent (10) Patent No.: US 9,049,053 B2
(45) Date of Patent: Jun. 2, 2015

(54) METHOD OF MANAGING AN OBJECT BY MEANS OF A MANAGEMENT GATEWAY USING A TELECOMMUNICATIONS NETWORK

(75) Inventor: Olivier Hersent, Louveciennes (FR)

(73) Assignee: ACTILITY, Lannion (FR)

( * ) Notice: Subject to any disclaimer, the term of this patent is extended or adjusted under 35 U.S.C. 154(b) by 77 days.

(21) Appl. No.: 13/704,562

(22) PCT Filed: Jun. 14, 2011

(86) PCT No.: PCT/FR2011/051341
§ 371 (c)(1),
(2), (4) Date: Dec. 14, 2012

(87) PCT Pub. No.: WO2011/157938
PCT Pub. Date: Dec. 22, 2011

(65) Prior Publication Data
US 2013/0089103 A1 Apr. 11, 2013

(30) Foreign Application Priority Data
Jun. 16, 2010 (FR) .................................. 10 54753

(51) Int. Cl.
*H04L 12/28* (2006.01)
*H04L 12/58* (2006.01)
(Continued)

(52) U.S. Cl.
CPC ............ *H04L 12/58* (2013.01); *B60L 11/1844* (2013.01); *B60L 11/1846* (2013.01);
(Continued)

(58) Field of Classification Search
CPC ............. B60L 11/1844; B60L 11/184; H04L 29/08756; H04L 29/06068; H04L 41/0896; H04L 67/2823; H04L 69/08

USPC .................................................. 370/392, 401
See application file for complete search history.

(56) References Cited

U.S. PATENT DOCUMENTS

2008/0040223 A1 2/2008 Bridges et al.
2009/0157835 A1 6/2009 Thompson et al.
(Continued)

FOREIGN PATENT DOCUMENTS

EP 2 131 553 A2 12/2009
WO WO-2007/140834 A1 12/2007
(Continued)

OTHER PUBLICATIONS

International Search Report for PCT/FR2011/051341, mailed Oct. 4, 2011.
(Continued)

*Primary Examiner* — Jae Y Lee
(74) *Attorney, Agent, or Firm* — Marshall, Gerstein & Borun LLP (57) ABSTRACT

The present invention relates to a method of managing an object (OBJ) through a management gateway (ONG) communicating with a system architecture present on a telecommunications network offering functionalities for registering objects and for routing messages. The method includes the registering (201) of the object with the system architecture by way of the management gateway, by using the registration functionality, and the control (203) of a parameter associated with the object through the management gateway, using the message routing functionality. The present invention also relates to a management gateway (ONG) corresponding to the management method.

12 Claims, 3 Drawing Sheets

(51) Int. Cl.
*B60L 11/18* (2006.01)
*H04L 29/08* (2006.01)
*H04L 12/24* (2006.01)
*H04W 4/00* (2009.01)
*H04L 29/06* (2006.01)

(52) U.S. Cl.
CPC ...... *H04L29/08792* (2013.01); *H04L 41/0896* (2013.01); *H04W 4/005* (2013.01); *Y02T 10/7005* (2013.01); *Y02T 10/7258* (2013.01); *Y02T 90/128* (2013.01); *Y02T 90/14* (2013.01); *Y02T 90/16* (2013.01); *Y02T 90/163* (2013.01); *B60L 11/184* (2013.01); *Y02T 90/169* (2013.01); *Y04S 10/126* (2013.01); *Y04S 30/14* (2013.01); *Y02E 60/721* (2013.01); *H04L 65/1016* (2013.01); *H04L 65/1006* (2013.01); *H04L 67/2819* (2013.01); *H04L 67/125* (2013.01); *H04L 67/14* (2013.01); *H04L 67/12* (2013.01); *H04L 69/08* (2013.01); *H04L 67/289* (2013.01); *Y02T 90/121* (2013.01)

(56) References Cited

U.S. PATENT DOCUMENTS

| | | |
|---|---|---|
| 2009/0207757 A1 | 8/2009 | Andreasen et al. |
| 2010/0141205 A1 | 6/2010 | Tyler et al. |
| 2011/0182205 A1* | 7/2011 | Gerdes et al. ............... 370/254 |
| 2011/0202910 A1* | 8/2011 | Venkatakrishnan et al. .. 717/171 |

FOREIGN PATENT DOCUMENTS

| | | |
|---|---|---|
| WO | WO-2008/109684 A1 | 9/2008 |
| WO | WO-2010/094714 A2 | 8/2010 |

OTHER PUBLICATIONS

Zhang et al., "Architecture Design of Embedded Home IMS Gateway Based on Convergence of IMS and Home Network," Embedded Software and Systems, IEEE International Conference on ICESS, pp. 271-276, 2008.

* cited by examiner

METHOD OF MANAGING AN OBJECT BY MEANS OF A MANAGEMENT GATEWAY USING A TELECOMMUNICATIONS NETWORK

FIELD OF THE INVENTION

The invention relates to the management of objects by way of a management gateway connected to a telecommunications network, and applies in particular to the field of energy resource management for resources such as electricity.

BACKGROUND OF THE INVENTION

In the field of telecommunications, new applications are usually first implemented in a proprietary format. One example of this is the first voice over IP systems (VOIP). Then standards are developed concerning protocols specifically designed for these new applications, e.g. the H.323 and SIP protocols for VOIP systems. Finally, when the development of the new applications expands to a larger scale, typically internationally, other standards are developed concerning the communication architecture. Such standards describe how the functions supporting the new applications are distributed and organized, such as the 3GPP IMS standard for VOIP and multimedia sessions.

For the field of object-to-object communications, the current situation is the following:

For local monitoring and sensor networks, various protocol standards currently exist, including local architecture standards. Examples in the field of building automation are protocols such as BACnet, Zigbee, LON or Zwave.

For wide-area sensor networks, only standards concerning the protocol exist, while others (COAP) are emerging. The collection of measurement data through centralized communication systems, or even remote control of consumer equipment, have also have been in existence for years.

More recently, the IP standard has been used as a basic communication protocol between monitoring servers and objects, and protocols based on the IP standard have been developed for functions such as police monitoring.

SUMMARY OF THE INVENTION

However, all the previously proposed protocols simply expand the scope of local object networks by encapsulating in the IP protocol the protocols used in these local object networks (such as Zwabe or Zigbee). This solution allows objects to communicate outside their environment on an IP network, but does not constitute a system-level standardized architecture as such.

Without a system-level standardized architecture, the prior art indicated above does not allow offering the following functionalities:

Complete control of processes which allow objects from different manufacturers to connect to a management infrastructure and benefit from the services provided by such a management infrastructure (services such as centralized authentication, metering and invoicing, communication between heterogeneous networks, security and filtering for data exchanges, monitoring, etc.).

Possibility for objects known and authenticated by a service provider A to connect to an infrastructure provided by a service provider B, so as to benefit from services offered by the service provider A with the resources offered by the service provider B, such as roaming.

Applications created by different developers are available simultaneously, benefiting from the pooled services offered by the underlying system architecture, and exposing their services to objects connected to the network and to other applications.

Objects implementing different local protocols can be interconnected through the central architecture.

Application servers can provide services to connected objects independently of the type of local network protocol supported.

Security mechanisms are provided based on network standards, to allow the object owners to selectively expose the data provided by these objects to other objects (independently of their local native protocols) or other applications, supplied by different distributors for example.

The object of the invention is to provide solutions to these disadvantages.

For this purpose, it proposes a method of managing an object through a management gateway communicating with a system architecture present on a telecommunications network offering object registration, message routing, and bandwidth management functionalities, said method comprising the registration of the object with the system architecture by way of the management gateway, using said registration functionality, and the control of an energy resource delivered and/or received by the object by means of this management gateway, using these message routing and bandwidth management functionalities.

Advantageously, the object is registered by means of an identifier comprising an identifier that is unique within a domain, and a domain identifier that is globally unique, particularly a URI address.

In an advantageous embodiment where the telecommunications network additionally offers an admission control functionality, the control of the parameter associated with the object additionally uses said admission control functionality, which makes it possible to manage the parameter associated with the object using the management principles of the telecommunications.

In an advantageous embodiment where the telecommunications network additionally offers an authentication functionality, the registration of the object with the system architecture additionally uses said authentication functionality, which makes it possible to manage the objects in a secure manner.

In an advantageous embodiment where the telecommunications network additionally offers a roaming functionality, the control of the parameter associated with the object additionally uses said roaming functionality, which makes it possible to manage objects that travel into the coverage of different networks, including managing the providing of electrical energy.

In one particular embodiment where the object is an electric vehicle, the management gateway is installed in said electric vehicle and is arranged to cooperate with an electrical recharging station in order to manage the supply of electricity to said electric vehicle.

In another particular embodiment where the object is an electric vehicle, the management gateway is installed in a charging station and is arranged to manage the supply of electricity to said electric vehicle by means of the charging station.

In a particularly advantageous embodiment, the telecommunications network presents an IMS system architecture, which makes it possible to benefit from all the functionalities intrinsically offered by this type of architecture.

In this particularly advantageous embodiment, there is transmission of at least one data item received from the object registered with the system architecture present on the telecommunications network, by means of the SIP protocol.

In particular, the data item received from the object is encapsulated in the data field and/or in the header of a frame organized according to the SIP protocol.

Advantageously, the data item received from the object to be managed indicates a need for electrical energy.

Advantageously, the method comprises the management gateway sending a message signaling a need for energy to an energy admission control sub-system.

In one embodiment, the management gateway is arranged to implement a predefined energy policy.

Advantageously, a data item received from the registered device is translated from a first protocol to a second protocol before being sent to the telecommunications network.

The invention also proposes a management gateway for an object, comprising a physical interface module able to communicate with the object and a network interface module able to communicate with a system architecture present on a telecommunications network, characterized by said management gateway being able to implement the method of managing an object as described above.

BRIEF DESCRIPTION OF THE DRAWINGS

The management method and the management gateway, objects of the invention, will be better understood by reading the following description and examining the attached drawings. In these drawings.

DETAILED DESCRIPTION

Figure 1:
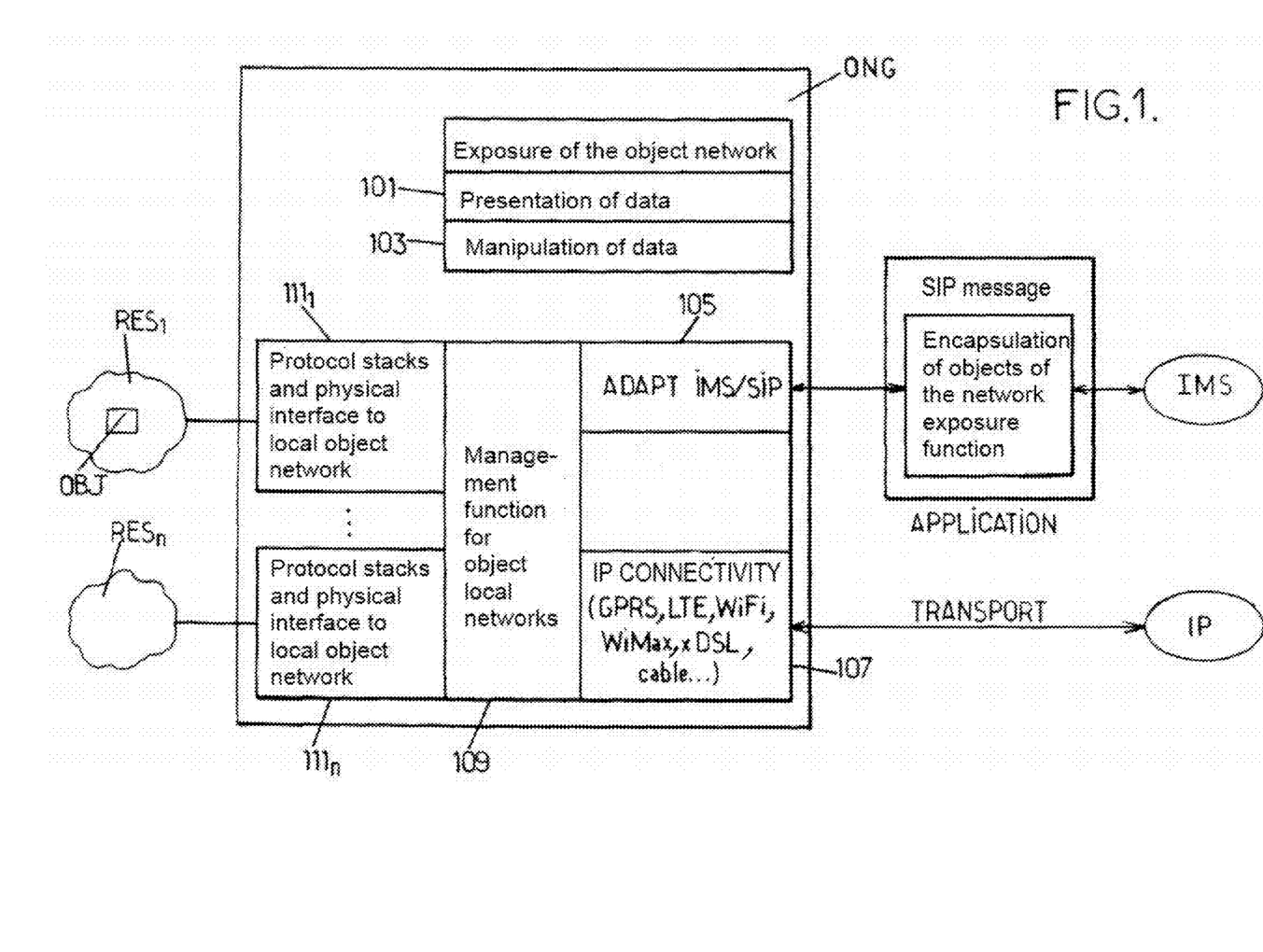
FIG. 1 illustrates a system comprising a management gateway ONG according to the invention.

FIG. 1 illustrates a system comprising a management gateway ONG according to the invention.

This management gateway ONG is able to manage at least one parameter associated with an object to be managed. Here, "object" is understood to mean a device presenting or using certain parameters that can be controlled or read.

Examples include:

All types of sensors (temperature, humidity, motion, meter reading interfaces, etc.), with a wired (e.g. carrier current) or wireless interface.

All types of actuators (switches, relays, electric locks, pilot wire managers) with a wired (e.g. carrier current) or wireless interface.

Fixed or mobile communication devices (GPS, alarms, medical monitoring, energy management centers, radio relays for tracking vehicles or packages).

Terminals for recharging batteries or electric vehicles, when they have communication interfaces for monitoring and controlling the charging.

Rechargeable electric vehicles, when they have communication interfaces for monitoring and controlling the charging.

Decentralized means of producing energy (such as wind or solar), when they have communication interfaces which allow monitoring and controlling the power supplied to the network, possibly as well as other parameters useful to their maintenance.

This management gateway ONG comprises the following various functional modules, allowing communication with at least one managed object, for example by interconnecting with one or more local object networks $NET_1, \ldots, NET_n$, to which this object belongs, and by interconnecting with a system architecture of the telecommunications network (which advantageously may be an IMS architecture) in order to use one or more functionalities of this architecture to manage the object:

A data presentation module (module 101): this module translates the data model specific to the local network of objects (for example Zigbee nodes and clusters) into a syntax (such as XML) and data model adapted for the central architecture. This syntax and data model must be sufficiently flexible to allow representing the various existing standards for local object networks, and are a key element to facilitating interoperability between networks of heterogeneous objects across the central infrastructure. This data presentation module also provides access on the local networks NETx to non-local objects and application servers (hosted or interconnected by the central system platform), presenting them in the data model appropriate for the local network.

A data manipulation module (module 103): this module offers a set of primitives for manipulating the local network of objects (for example data reads and writes), configuring event notification services, and more generally making available to the central architecture all services enabling access to the functionalities of networks of connected objects and to the connected objects for interacting with non-local objects and application servers. Typically the primitives can be described in XML/WSDL, and can be applied to the objects of the network as represented by the data presentation layer (XML object for example). These primitives may comprise primitives independent of local protocols (e.g. read or write primitives) and possibly exposure of native control primitives of local protocols.

An interface for adapting to IMS/SIP (module 105). This protocol binding module allows exposing the data presentation layer and the data manipulation layer across an IMS/SIP network. It can also provide an interface between these layers and native IMS/SIP mechanisms; examples include registering objects with the local network in the registries of the IMS platform, event state publication through SIP PUBLISH or NOTIFY messages, subscribing to notifications using SUBSCRIBE messages, etc.

A connectivity module, for example IP (module 107), which provides direct or indirect interconnection of the management gateway ONG with an internet type of network, using the IP protocol, by means of a transport layer. An example of an indirect connection could be the encapsulation of messages in the SMS messages of the GSM/UMTS/3G network.

A management module for managing local object networks (module 109), in particular ensuring connectivity with the nodes of object networks and the data exchanges, as well as security at the local level. This could be a ZigBee coordinator (ZC), for example.

Protocol and physical interfaces (modules 1111 ... 111n) respectively associated with one of the local networks of local objects NET1, ..., NETn to which the object to be managed belongs.

The different functional modules and interfaces described above may be in the form of software modules implemented on a server corresponding to the management gateway, for example.

Figure 2:
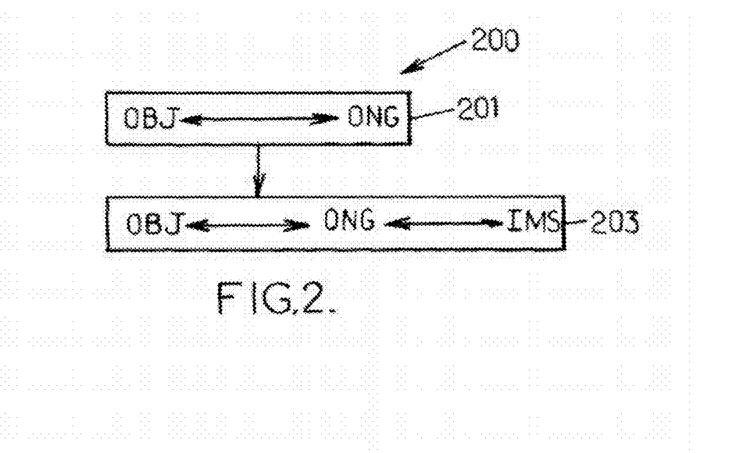
FIG. 2 illustrates an embodiment of the management method of the invention.

FIG. 2 illustrates an embodiment of the method 200 of managing an object according to an embodiment of the invention.

This management method comprises a first step 201 of registering the object with the telecommunications network by way of the management gateway ONG, using a registration functionality associated with the system architecture (IMS for example) of the telecommunications network.

When the object is part of a local object network, the name of the object registered with the network advantageously comprises at least one identifier of the administrative domain of the object, and a unique identifier of the object within the administrative domain.

This registration is done by means of a registration functionality already offered on the telecommunications network, and therefore does not require creating a new functionality at this level.

When the object itself belongs to a local object network, the management gateway ONG uses one of its connection interfaces connected to the specific local object network of the object to be managed, using for example protocols such as ZigBee, 6lowPan, Z-wave, Lon, or others, to obtain a catalog of the objects present in these networks.

The management gateway ONG uses an interconnection with the IP protocol, and can offer local management interfaces such as http for example.

The management gateway ONG thus performs a proxy registration of the object to be managed, with the system architecture of the telecommunications network.

Advantageously, the registration of the object is done by means of an identifier comprising a unique identifier within a domain, and a globally unique domain identifier, such as a URI address. Thus in an illustrative example where a thermometer object uses the local network protocol Z-wave with an identifier ID 12, it can be recognized on the telecommunications network by a URI such as z12@site1.example.net by means of such a proxy registration. z12 is the unique identifier of the object within the administrative domain site1.example.net.

This allows the other servers in the telecommunications network to know of the existence of the registered object and to interact with this object using the semantics specific to it, via the management gateway ONG.

Once the object is registered with the system architecture of the telecommunications network by way of the management gateway ONG, a step 203 of controlling a parameter associated with the object by said management gateway is conducted, by means of at least one functionality associated with the system architecture of the telecommunications network, using a message routing functionality offered by the telecommunications network.

When the telecommunications network additionally offers an authentication functionality, the step 201 of registering the object with the system architecture of the telecommunications network advantageously uses this authentication functionality.

This centralized authentication function frees application developers from worrying about verifying the identity of accessible objects, or about whether they are legitimately entitled to access system resources, as this verification is one of the centralized functions of the system architecture, possibly including roaming cases.

Also, when the telecommunications network additionally offers a roaming functionality, the step 203 of verifying the parameter associated with the object additionally uses this roaming functionality to allow managing the parameter associated with the object in host networks that are different from its network of origin.

The architecture of the system additionally allows multiple applications to have read or write access to the parameters of the registered objects. An object is not registered with a particular application server, but with the registration function of the system architecture which offers it access to all the applications hosted by the system and to all the interconnected objects authorized to do so (through their own ONG), even those using different native protocols (in the local object network).

Lastly, as the registration is soft-state, meaning it is regularly refreshed by the ONG, the registration server for the architecture also offers all the applications of the system the ability to subscribe to registration/deregistration events (explicit or following a non-renewal of registration) for objects they are interested in. Thus all the applications can monitor the presence of objects in the network, without each application having to establish a mechanism for periodic checks (polling). The centralized polling mechanism also allows keeping open the associations (pinholes) of routers/firewalls performing IP address translations (NAT or NAPT) and located between the ONG and the system architecture, thus making it possible for the system platform (and therefore any application or object that is part of the system) to send messages to the ONG, even when the ONG is located behind a NAT router or a firewall. In one particular embodiment, the system architecture of the telecommunications network to which the management gateway ONG is connected is an IMS architecture (IP Multimedia Subsystem) which allows managing multimedia sessions.

Such an IMS system architecture is advantageous in the sense that it inherently offers the following functionalities, among others, which can be used when registering an object and/or controlling a parameter of an object to be managed:
  Object registration and monitoring
  Message authentication and filtering
  Admission control
  Routing messages according to an application level identifier that is distinct from network identifiers (typically URIs), from object to object, from object to application.
  Message routing and functional interconnection of an administrative domain to other administrative domains (roaming)
  Establishing relations between application servers and objects.

In such a case, the management gateway ONG behaves as an agent using SIP (Session Initiation Protocol, a multimedia protocol defined by RFC 3265) and uses additional semantics defined in the specifications of the 3GPP standard for user equipment and in the specifications of the TISPAN standard for client network gateways.

Each management gateway ONG can use the REGISTER primitives to declare itself as well as to declare the objects of the object networks that it manages. In an alternative embodiment, the thermometer object is declared by the ONG to the IMS network by means of a notification to update the data model of the network of objects (PUBLISH message signaling that there is a new thermometer object in the data model of the network of objects).

In this particular embodiment using IMS, the invention allows using the functionalities offered by the IMS-type system architecture to manage one or more parameter(s) of an object. Semantics specific to this IMS-type architecture, for example by means of the SIP protocol, can be employed so that the servers of the telecommunications network communicate with the registered object.

In an advantageous embodiment, a correspondence is established between the semantics used in the protocols of the local object networks and the semantics used in the transmission protocol employed in the telecommunications network. Thus, in the illustrative example of an IMS architecture in which the SIP protocol is used, a correspondence is established between the semantics used in the protocols of the local object networks and the data field of standard SIP messages.

To do this, in a particular embodiment, the binary message used for managing the object in the local object network is encapsulated unchanged within the data field of a SIP message.

In another advantageous embodiment, the management gateway ONG can translate each semantic item of the protocol of the local object network managing the object into an object control syntax that is not dependent on any particular protocol.

This is possible because the object to be managed is registered with the telecommunications network, and therefore that object possesses an address valid for the entire IMS network independently of the native protocol that locally manages the object.

Such an address can be used as a protocol-agnostic destination address for notifications, subscriptions to events, or other object-to-object messages.

Establishing a correspondence for the primitive data of a local object network protocol in a web services description language model compatible with the SIP protocol, on an IMS infrastructure, offers multiple advantages:

Objects can thus communicate with each other, independently of their native management protocols.

Application servers can be programmed to be agnostic to the type of object network, and can access all the services offered by the native local protocols for object management.

Multiple application servers, implementing different functionalities originating for example from different suppliers, can interact with the same object. For example, a correspondence can be established between temperature values measured by a sensor and a source of an SIP event (RFC 3265). Various application servers can then simultaneously access the same data provided by the sensor, by subscribing to temperature events exposed by the sensor, and can receive the desired notifications through later SIP notification messages. Such a characteristic makes it possible to have a model for managing object applications which is hosted on the network.

A network with an IMS architecture provides network security mechanisms for subscribing to events (publication/notification model) which provides a security framework for notifications between objects that is currently unavailable in most management solutions for local objects.

The IMS architecture provides standard functionalities for registration, polling, authentication, etc., which allow relieving the application servers of object management for certain extremely resource-heavy tasks. As an example, a network of a million objects to be managed in which the connectivity and response time must be estimated by the service provider every hour requires a minimum of 600 messages per second. The IMS system architecture distributes this load across the proxy servers (P-CSCF).

The IMS system architecture, designed to ensure a global mobile communication service, offers a management infrastructure for terminals connected outside their network of origin (roaming). This particularly complex system model allows:

In the host network, locating the network of origin of the connected terminal

In the network of origin, continuing to control and offer services to the terminal regardless of the host network In the managed object, benefiting from the resources of the host network under the control of the network of origin.

In all the networks, host and origin, invoicing for the services offered.

In the particular case where the object to be managed requests a resource, such as bandwidth or electrical power for example, the step 203 of controlling the parameter associated with the object additionally and advantageously uses an admission control functionality offered by the telecommunications network.

Such admission control is particularly advantageous for the following reasons:

The distribution networks (whether distributing telecommunications bandwidth or energy) are designed so that the needs of the end users are met, both in quality and quantity. As demand is random (cars plugged in, files being sent), the probability of very high demand at certain points in the network is not zero.

In the absence of admission control, which is the current case for electricity distribution networks, the design of the networks must accommodate strong spikes (which implies significant cost) and even under these conditions, conditions involving extreme spikes are accompanied by a degradation in the service provided (for example in terms of voltage and frequency stability or load shedding), which does not take into account the users' need for quality.

Admission control allows controlling demand by selectively refusing or shifting demand that cannot be met or that is of lower priority: this selective refusal allows more stability and control of the quality of service in the distribution network, and reduces network costs by eliminating extreme spikes while providing priority users with increased availability.

Figure 3:
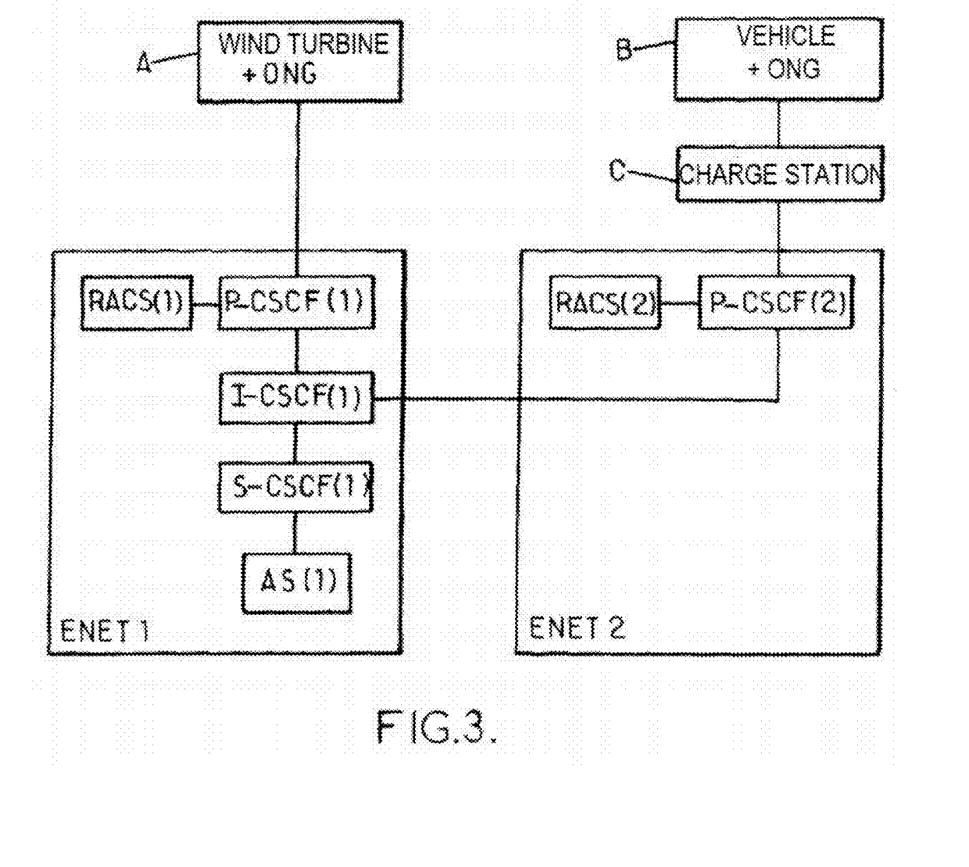
FIG. 3 illustrates an embodiment of a system adapted for a context of energy resource management using the IMS system architecture.

FIG. 3 illustrates an embodiment of a system adapted for a context of energy resource management, illustrating the advantages provided by the use of the IMS system architecture.

In this FIG. 3, in an electric power transmission network of origin, designated as ENET1, at least one (or more) wind turbines A serving as an object to be managed is connected by means of a management gateway ONG to the module P-CSCF (1) providing access to the IMS network, with which various modified gateways can be registered. Modules RACS (1), I-CSCF (1), S-CSCF (1) and AS(1), similar to those used in an IMS architecture, are also present in the electric power transmission network of origin designated as ENET1.

The module I-CSCF(1) of the network ENET1 is connected to the module P-CSCF (2) of a host electric power transmission network ENET2, which may also comprise a module RACS (2) connected to the module P-CSCF(2).

This module P-CSCF(2) is connected to a charging station 2, which can recharge an electric vehicle 1 having an onboard management gateway ONG. This gateway handles the energy management for the electric vehicle 1.

Figure 4:
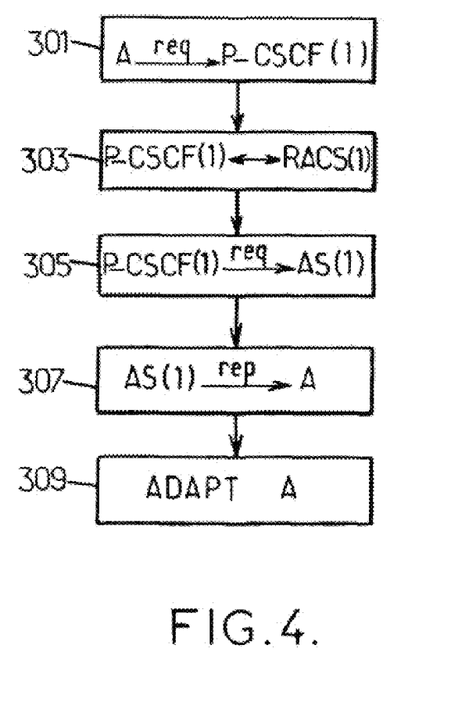
FIG. 4 illustrates the steps of an embodiment of the management method corresponding to the system adapted for a context of energy resource management, within a framework of managing electrical energy generation.

FIG. 4 illustrates the steps of an embodiment of the management method corresponding to the system adapted for a context of energy resource management illustrated in FIG. 3, specifically within a framework of managing electrical energy generation.

In this management method, the wind turbine A sends by means of the management gateway ONG, during a gust of wind for example, a request req to authorize the input of electrical energy into the network (step 301).

The module P-CSCF (1) receives this request req and communicates (step 303) with the sub-system RACS (1) so the latter can verify the admissibility of this request, in light of energy flows currently present in the network. The module RACS (1) may possibly also reduce the demand for energy input, for example in a situation of high wind and full sunlight throughout the region that has created a production of renewable energy exceeding the network capacity for electricity transmission and distribution.

If this request is found to be admissible by the sub-system RACS(1), the module P-CSCF (1) sends (step 305) the request, possibly reduced, to the module I-CSCF (1) and the module S-CSCF (1), which route this request to the application server AS (1) handling the application management for the wind turbine.

This server AS(1) may possibly modify the request according to administrative criteria and generates a response rep to this request.

The response rep to the request is then propagated in the reverse direction (step 307) to the management gateway ONG of the wind turbine A, the RACS(1) updates its energy flow database, and after receiving the response, the wind turbine A is adapted to the authorization received by adjusting the blade pitch (step 309).

Figure 5:
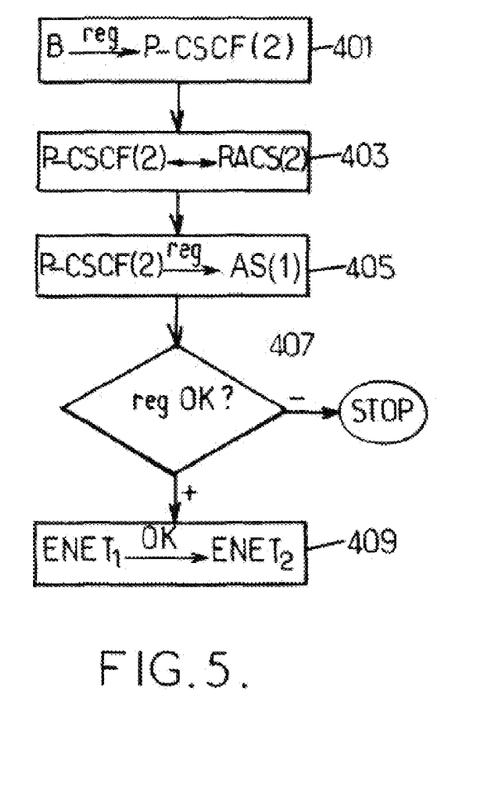
FIG. 5 illustrates the steps of another embodiment of the management method corresponding to the system adapted for a context of energy resource management, within a framework of managing electrical energy consumption.

FIG. 5 illustrates the steps of another embodiment of the management method, corresponding to the system adapted for a context of managing energy resources illustrated in FIG. 3, particularly within a framework of electrical energy consumption.

In this embodiment, an electric vehicle B, subscribing to the network of origin ENET1, is plugged into a charging station C associated with the host network ENET2.

As illustrated in FIG. 3, a management gateway ONG as described above is carried onboard the vehicle B and sends (step 401) a recharge authorization request reg which passes through the charging station C, which propagates it to the module P-CSCF (2) of the host network ENET2.

The module P-CSCF (2) then communicates with the sub-system RACS (2) of the host network ENET2 in order to verify the availabilities of the host energy distribution network. If numerous cars are connected simultaneously, the demand is possibly reduced according to local electric power transmission capacities.

After this verification, the recharge authorization request reg is sent (step 405) to the application server AS(1) of the network of origin ENET1.

After receipt of this recharge authorization request, the application server AS can modify this request according to administrative criteria. It can thus reject it if the vehicle has not subscribed to recharging while roaming, or it can modify the priority level.

If the application server AS decides the recharging authorization request is acceptable (step 407), it authorizes the host network ENET2 to proceed with recharging the vehicle (step 409), with possibly reduced parameters (admission priority, charging current, etc.).

Thus the technical authorization of the charging parameters (technical admission control) is done in the host network ENET2, by the host sub-system RACS (2), based on its knowledge of the energy flows in the host network, while the administrative authorization (is the vehicle subscribed to a roaming service? rapid charging service? Is it authorized to connect to the host network?) is done by the application server(s) AS of the network of origin ENET1, with which the vehicle owner has an administrative relationship (typically, the one through which he is subscribed to the service).

The discovery and routing of messages from the vehicle to the host network is permitted by the structure used to name the objects in the system architecture during their registration. The messages originating from voitureX@domaineY are routed to the I-CSCF of domain Y, by means (in the IMS architecture) of functionalities for domain name resolution to DNS network addresses in IP networks. The IMS ensures that all the intermediate servers, e.g. P-CSCF(2), add their own identifiers as the message is routed. The responses are routed from the domain of origin to the vehicle in the reverse direction, using this list of intermediate servers.

This type of system allows responding to the challenges raised by the increased use of renewable energy sources (which render the production of electricity less predictable) and by the planned introduction of recharging stations for electric vehicles which will place additional constraints on electrical distribution networks.

These additional constraints will require the introduction of a sophisticated infrastructure for energy policy management for electrical distribution networks.

Thus, in a particular embodiment of the invention, the management gateway ONG according to the invention is comprised within a rechargeable electric vehicle. In another particular embodiment, the management gateway ONG of the invention is comprised in the recharging station itself.

In the particular embodiment where the network gateway of the invention is comprised in the recharging station itself, the object registering with the gateway corresponds to a rechargeable vehicle wanting to connect to the recharging station in order to recharge electrically.

To do this, the electric vehicle can use an authentication mechanism to communicate with the network gateway of the charging station, by means of a local network protocol.

The network gateway of the charging station then translates the information received from the electric vehicle according to semantics adapted for the telecommunications network to which the network gateway belongs, in particular by adapting the identifiers received in the format (unique identifier)@domain for the requirements of the registration step.

Thus, if the telecommunications network to which the network gateway belongs has an IMS architecture, the network gateway of the charging station translates the information received from the electric vehicle according to semantics adapted for this IMS architecture. In particular, the network gateway can encapsulate the information received in a registration message according to the SIP protocol.

The fact of using a network gateway connected to an IMS architecture is particularly advantageous in the context of recharging electric vehicles, particularly because it allows using the roaming functionality offered by such an IMS architecture, which is particularly suited for the case of rechargeable vehicles which are not systematically recharged at the same electrical recharging station.

This roaming functionality can be implemented at different levels in an IMS architecture. In particular, this roaming functionality can be employed in the signaling only, which allows a visiting user (for example a car) to exchange signaling messages with its network of origin. Such a roaming mode is also particularly suited for remote maintenance applications.

In a particular embodiment allowing the user to use the resources of a communication network, the standards 3GPP and TISPAN associated with the IMS architecture define a PCC (Policy and Charging Control) sub-system comprising the following functional modules:

an application functional module (AF module for Application Function) on the path of the SIP messages. This module is usually hosted by the proxy server CSCF of the IMS architecture and requests resources from a PCRF module (using the 3GPP standard), for example by means of a RACS interface according to the TISPAN standard.

a policy and charging rule function module (PCRF module in the 3GPP standard). In the TISPAN architecture, this module can correspond to a resource and admission control subsystem (RACS) which would know the topology of the network and the resource allocation policy rules (service policy decision function or SPDF) and can communicate with a set of admission control servers (RACF for Resource and Admission Control Function) organized according to the topology of the underlying network.

For example, this set of control servers can be hierarchically organized according to the branching topology typical of energy distribution networks.

a policy and charging enforcement function module (PCEF). Such a PCEF module can be controlled by the PCRF module by means of an interface Gx.

in the TISPAN architecture, a resource control enforcement function module (RCEF). Such an RCEF module can be controlled by an RACF module via an interface Re.

In the 3GPP Release 9 specification, these network functionalities are defined specifically for allocating resources of a telecommunications network, such as bandwidth for example. In particular, the semantics used by the interfaces Rx, Gq', Rx and Re only target bandwidth management.

The invention attempts to use these mechanisms specific to the IMS architecture to manage the allocation of energy resources for which they are not initially intended, as the IMS architecture was not designed to manage an underlying energy distribution network.

To do this, the network gateway modified according to the invention encapsulates its electric power transmission requirements in the SIP message adapted for this purpose and sent by the management gateway ONG.

In one particular embodiment, the management network ONG establishes an SIP session for the duration of its connection to the electrical network. To do this, the management gateway ONG encapsulates a request for electric power transmission within the session launch message, using an appropriate syntax (for example in the case of a SDP using a specific parameter for active or reactive electrical power, an estimate of the total energy required during the recharging session).

As such a message passes through the network of origin of the vehicle, this network of origin can verify the authorization from the modified network gateway to use the required resources and implement priority mechanisms, and can decide to lower the desired parameters, for example reducing the maximum recharging current. To do this, the negotiation mechanisms offered by the SIP protocol can be employed, such as the SDP offer/answer mechanism (RFC 3264) or other equivalent mechanisms.

However, the fact that the authorization to use a resource is given by the network of origin of the electrical vehicle or by a process at the application level does not necessarily mean that the network is able to provide such a resource.

In an advantageous embodiment, the fact that the SIP messages exchanged between the modified network gateway and the network pass through an application function module AF allows making use of the policy and charging control subsystem PCC.

As indicated above, the semantics usually used by the interfaces Rx, Gq', Rx and Re only target bandwidth management. In one particular embodiment, these interfaces use semantics appropriate to the requirements of an energy delivery network in a manner that replaces the concept of bandwidth with a concept of electric power. With such semantics, all the mechanisms currently defined for communication networks with an IMS architecture are available to respond to admission and charging control requirements in an energy distribution network.

Thus, in a particular embodiment, the recharging station acts as an element executing an energy policy, for example by limiting the current and/or the length of the recharging session. In an illustrative example, a wind farm located at an interconnection with the electric power transmission network behaves like an authorized energy supply PCEF module and connects and/or disconnects according to the requests issued by the PCRF module.

In an advantageous embodiment, an SPDF module adapted for energy management and an RACF module adapted for energy management model the topology and maximum capacity of the energy distribution network instead of modeling the topology and maximum capacity of the links in a telecommunications network.

The difference between such an RACF module intended for electricity management and a conventional RACF module intended for telecommunications is that the upload and download bandwidths are completely separate from or are added onto the telecommunications links, while they counterbalance each other in an electrical distribution network. Such a difference is wholly internal to the implementation of the RACF module and is in alignment with the IMS architecture and the associated policy and charging control PCC subsystems.

In one particular embodiment, an RACS module adapted for energy management is configured with the topology of and with a capacity model associated with the electrical distribution network.

This RACS module is advantageously configured with pre-delivery admission requests corresponding to consumption estimates for authorized or referred users. It can be updated dynamically with modified admission requests resulting from load shedding or other demand management schemes.

All other consumers, such as rechargeable vehicles, or producers, such as wind farms, are subject to the energy rules implemented by such an RACS module adapted for energy management.

In particular, at critical preconfigured charging levels, the RACS module can trigger local or general alarms having an impact on existing admission requests or trigger external mechanisms for load shedding. For example, rechargeable vehicles can have reduced pricing for the long-term recharging use impacted by the load shedding.

Of course, the invention is not limited to the example embodiments described and represented above. Other modes and forms of its embodiments can be imagined without leaving the scope of the invention.

The invention claimed is:

1. Method of managing an object through a management gateway communicating with a system architecture present on a telecommunications network offering object registration, message routing, and IMS bandwidth management semantics, said method comprising the registration of the object with the system architecture by way of the management gateway, using said registration functionality, the transmission of at least one data item received from the object registered with the system architecture present on the telecommunications network, by means of the SIP protocol, wherein the data item received from the object to be managed indicates a need for the supply of electricity, and the control of an energy resource received by the object by means of said management gateway, using said message routing and replacing the bandwidth with the energy resource in the IMS bandwidth management semantics.

2. Management method according to claim 1, wherein the registration of the object is carried out by means of an identifier comprising an identifier that is unique within a domain, and a domain identifier that is globally unique, particularly a URI address.

3. Management method according to claim 1, wherein the telecommunications network additionally offers an admission control functionality, wherein the control of the parameter associated with the object additionally uses said admission control functionality.

4. Management method according to claim 1, wherein the telecommunications network additionally offers an authentication functionality, wherein the registration of the object with the system architecture additionally uses said authentication functionality.

5. Management method according to claim 1, wherein the telecommunications network additionally offers a roaming functionality, wherein control of the parameter associated with the object additionally uses said roaming functionality.

6. Management method according to claim 1, wherein the object is an electric vehicle, wherein the management gateway is installed in said electric vehicle and the management gateway is arranged to cooperate with an electrical recharging station in order to manage the supply of electricity to said electric vehicle.

7. Management method according to claim 1, wherein the object is an electric vehicle, wherein the management gateway is installed in a charging station and is arranged to manage the supply of electricity to said electric vehicle by means of the charging station.

8. Management method according to claim 1, wherein the data item received from the object is encapsulated in the data field and/or in the header of a frame organized according to the SIP protocol.

9. Management method according to claims 1, wherein the method comprises the sending by the management gateway of a message signaling a need for energy to an energy admission control sub-system.

10. Management method according to claim 1, wherein the management gateway is arranged to implement a predefined energy policy.

11. Management method according to claim 1, wherein a data item received from the registered device is translated from a first protocol to a second protocol before being sent to the telecommunications network.

12. Management gateway for an object, comprising a physical interface module able to communicate with said object and a network interface module able to communicate with a system architecture present on a telecommunications network, wherein said management gateway is able to implement the method of managing an object according to claim 1.

* * * * *